United States Patent
Kim

(10) Patent No.: US 8,894,497 B2
(45) Date of Patent: *Nov. 25, 2014

(54) SLIDING BALL TYPE CONSTANT VELOCITY JOINT FOR VEHICLE

(71) Applicant: Hyundai Wia Corporation, Gyeongsangnam-do (KR)

(72) Inventor: Pil Ki Kim, Seoul (KR)

(73) Assignee: Hyundai Wia Corporation, Gyeongsangnam-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,681

(22) Filed: Jul. 16, 2013

(65) Prior Publication Data

US 2013/0310185 A1 Nov. 21, 2013
US 2014/0148258 A2 May 29, 2014

Related U.S. Application Data

(62) Division of application No. 13/326,627, filed on Dec. 15, 2011, now Pat. No. 8,512,156.

(30) Foreign Application Priority Data

Jun. 3, 2011 (KR) .................. 10-2011-0053744

(51) Int. Cl.
*F16D 3/223* (2011.01)
*F16D 3/24* (2006.01)
*F16D 3/227* (2006.01)

(52) U.S. Cl.
CPC *F16D 3/24* (2013.01); *F16D 3/227* (2013.01); *F16D 3/223* (2013.01); *Y10S 464/906* (2013.01); *F16D 2003/22303* (2013.01)
USPC .......................... 464/146; 464/906

(58) Field of Classification Search
USPC ................... 464/141, 143–146, 906
See application file for complete search history.

(56) References Cited

U.S. PATENT DOCUMENTS 5,853,328 A * 12/1998 Kobayashi et al. ........... 464/146
6,299,544 B1 * 10/2001 Schwarzler et al. .......... 464/146

(Continued)

FOREIGN PATENT DOCUMENTS

EP   1845274 A1   10/2007
FR   2786829      6/2000

(Continued)

OTHER PUBLICATIONS

Extended European Search Report dated Aug. 9, 2013; Reference K611010EP—8 pages.

(Continued)

*Primary Examiner* — Gregory Binda
*Assistant Examiner* — Josh Skroupa
(74) *Attorney, Agent, or Firm* — Stetina Brunda Garred & Brucker

(57) ABSTRACT

Provided is a sliding ball type constant velocity joint for a vehicle, and more particularly, to a sliding ball type constant velocity joint for a vehicle, which can absorb idle vibration generated from the vehicle during idling by creating a clearance between an outer spherical surface of an inner race and an inner spherical surface of a cage. The sliding ball type constant velocity joint includes a shaft which receives rotational power from an engine and rotates, an outer race which is installed at an end of the shaft and having grooves formed therein, an inner race installed in the outer race, a plurality of balls for transmitting the rotational power of the outer race to the inner race, and a cage for supporting the balls, wherein a center of a radius of an outer spherical surface of the inner race is formed at a different location from a center of a radius of an inner spherical surface of the cage.

2 Claims, 7 Drawing Sheets

(56) References Cited

U.S. PATENT DOCUMENTS

| | | |
|---|---|---|
| 7,862,439 B2 | 1/2011 | Goto et al. |
| 8,079,914 B2 | 12/2011 | Une et al. |
| 8,512,156 B2 * | 8/2013 | Kim .............................. 464/146 |

FOREIGN PATENT DOCUMENTS

| | | |
|---|---|---|
| JP | 02-271109 | 6/1990 |
| JP | 03255226 | 11/1991 |
| WO | 98-00646 | 1/1998 |
| WO | 2004-097238 A1 | 11/2004 |

OTHER PUBLICATIONS

English Abstract of Japanese Publication 02-271109; date of Publication Jun. 11, 1990.

Chinable IP, State Intellectual Property Office of People's Republic of China, (English Translation) Notification of the First Office Action, (Original Chinese) Notification of the First Office Action, Mar. 5, 2014, 12 pages.

* cited by examiner

SLIDING BALL TYPE CONSTANT VELOCITY JOINT FOR VEHICLE

CROSS-REFERENCE TO RELATED APPLICATIONS

This application is a divisional of U.S. patent application Ser. No. 13/326,627 entitled SLIDING BALL TYPE CONSTANT VELOCITY JOINT FOR VEHICLE filed Dec. 15, 2011, which claims priority to and the benefit of Korean Patent Application No. 10-2011-0053744, filed on Jun. 3, 2011, the entire content of which is incorporated herein by reference.

STATEMENT RE: FEDERALLY SPONSORED RESEARCH/DEVELOPMENT

Not Applicable

BACKGROUND OF THE INVENTION

1. Field of the Invention

The present invention relates to a sliding ball type constant velocity joint for a vehicle, and more particularly, to a sliding ball type constant velocity joint for a vehicle, which can absorb idle vibration generated from the vehicle during idling by creating a clearance between an outer spherical surface of an inner race and an inner spherical surface of a cage.

2. Description of the Related Art

In general, a joint functions to transmit rotational power (torque) between two rotation shafts which meet each other at an angle. In the case of a propeller shaft having a small power transmission angle, a hook joint, a flexible joint, etc. are used, and in the case of the driving shaft of a front wheel drive vehicle having a large power transmission angle, a constant velocity joint is used.

Since the constant velocity joint can reliably transmit power at a constant velocity even when an angle between a driving shaft and a driven shaft is large, the constant velocity joint is mainly used for the axle shaft of an independent suspension type front wheel drive vehicle. When viewed from a shaft, a tripod type constant velocity joint is provided to one end of the shaft which faces an engine (the inboard-side end), and a fixed ball type joint is provided to the other end of the shaft which faces a tire (the outboard-side end).

FIG. 1 is a cross-sectional view illustrating a conventional constant velocity joint for a vehicle.

As shown in FIG. 1, the conventional constant velocity joint for a vehicle comprises a housing 2 which transmits rotational power of the engine (not shown) and is defined with track grooves on the inner surface thereof, a shaft 1 which receives the rotational power from the housing 2 and rotates, an outer race 2 which is installed at an end of the shaft 1 and having grooves formed therein, an inner race 3 installed in the outer race 2, a plurality of balls 4 for transmitting the rotational power of the outer race 2 to the inner race 3, and a cage 5 for supporting the balls 4.

The outer race 2 has a track groove 21 parallel with the center axis and a cylindrical inner diameter 22.

The inner race 3 has a track groove 31 parallel with a central axel and an outer spherical surface cylindrical inner diameter 32.

The cage 5 has an outer spherical surface 51 having a spherical portion and a linear portion and an inner spherical surface 52 having a spherical portion.

Hereafter, the operation of the conventional sliding ball type constant velocity joint for a vehicle constructed as mentioned above will be described.

As the rotational power outputted from an engine (not shown) is transmitted to the shaft 1 through a transmission (not shown) and then transmitted to the inner race 3 through the outer race 2 and the ball 4, so that then a wheel (not shown) is rotated.

The ball 4, which is restrained by a grinding surface 53 of the cage 5 and is also restrained between the track groove 21 of the outer race 2 and the track groove 31 of the inner race 3, transmits rotational torque. In this case, the inner spherical surface 51 of the cage 5 restrains the outer spherical surface 32 of the inner race 3, and the grinding surface 53 of the cage 5 restrains the ball 4, thereby enabling axial sliding and articulated joint movement. When the joint is articulated, the cage 5 and the balls 4 are positioned on a bisecting line of an operating angle, thereby enabling constant velocity movement.

Therefore, as the ball 4 slidably moves in the track groove 21 of the outer race 2, the joint is articulated to follow the displacement of the vehicle.

However, the conventional sliding ball type constant velocity joint is configured such that axial power transmitted to the axially moving inner race 3 is transmitted to the inner spherical surface 52 of the cage 5 through the outer spherical surface 32 of the inner race 3 to push the balls 4. That is to say, the inner race 3, the cage 5, and the balls 4 are subunits, which move in the same axial direction at the same time, may not absorb idle vibration generated from the vehicle during idling but may transmit the same to a vehicle body.

BRIEF SUMMARY OF THE INVENTION

Accordingly, the present invention has been made to solve the above-mentioned problems occurring in the prior art, and an object of the present invention is to provide a sliding ball type constant velocity joint for a vehicle, which can absorb idle vibration generated from the vehicle during idling by creating a clearance between an outer spherical surface of an inner race and an inner spherical surface of a cage.

Another object of the present invention is to provide a sliding ball type constant velocity joint for a vehicle, which can additionally secure axial clearance allowance by changing configurations of an inner spherical surface of the cage and outer spherical surfaces and the inner race.

In accordance with one aspect of the present invention, there is provided a sliding ball type constant velocity joint for a vehicle, including a shaft which receives rotational power from an engine and rotates, an outer race which is installed at an end of the shaft and having grooves formed therein, an inner race installed in the outer race, a plurality of balls for transmitting the rotational power of the outer race to the inner race, and a cage for supporting the balls, wherein a center of a radius of an outer spherical surface of the inner race is formed at a different location from a center of a radius of an inner spherical surface of the cage.

The outer spherical surface of the inner race may be divided into two sections having different radii.

The radii of the two sections of the outer spherical surfaces of the inner race may be equal to the radius of the inner spherical surface of the cage.

The centers of the radii of the two sections of the outer spherical surfaces of the inner race may be formed at locations axially moved from a center of the radius of the inner spherical surface of the cage.

The radii of the two sections of the outer spherical surface of the inner race may be smaller than the radius of the inner spherical surface of the cage.

The centers of the radii of the two sections of the outer spherical surface of the inner race may be formed at locations axially and radially moved from the center of the radius of the inner spherical surface of the cage.

One of the radii of the two sections of the outer spherical surface of the inner race may be smaller than the radius of the inner spherical surface of the cage, and the other of the radii of the two sections of the outer spherical surface of the inner race may be equal to the radius of the inner spherical surface of the cage.

The centers of the radii of the two sections of the outer spherical surface of the inner race may be formed at locations axially moved from the center of the radius of the inner spherical surface of the cage, and one of the centers of the radii of the two sections of the outer spherical surface of the inner race may be formed at a location radially moved from the center of the radius of the inner spherical surface of the cage.

The outer spherical surface of the inner race may have a radius, which is smaller than the radius of the inner spherical surface of the cage.

The outer spherical surface of the inner race has a radius and taper angles may be formed at opposite ends of the outer spherical surface of the inner race.

The radius of the outer spherical surface of the inner race may be smaller than the radius of the inner spherical surface of the cage.

The center of the radius of the outer spherical surface of the inner race may be formed at a location axially moved from the center of the radius of the inner spherical surface of the cage.

As described above, in the sliding ball type constant velocity joint for a vehicle according to the present invention, idle vibration generated from the vehicle can be absorbed by creating a clearance between the outer spherical surface of the inner race and the inner spherical surface of the cage.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Hereinafter, a preferred embodiment of the present invention will be described with reference to the accompanying drawings with several exemplary or preferred embodiments thereof. Other advantages and features of the invention will also become apparent upon reading the following detailed description and upon reference to the accompanying drawings.

However, the following descriptions of such embodiments are intended primarily for illustrating the principles and exemplary constructions of the present invention, and the present invention is not specifically limited to these exemplary embodiments. Thus, one skilled in the art can appreciate or recognize that various modifications, substitutions and equivalents thereof can be made thereto without departing from the spirit and scope of the present invention.

Figure 1:
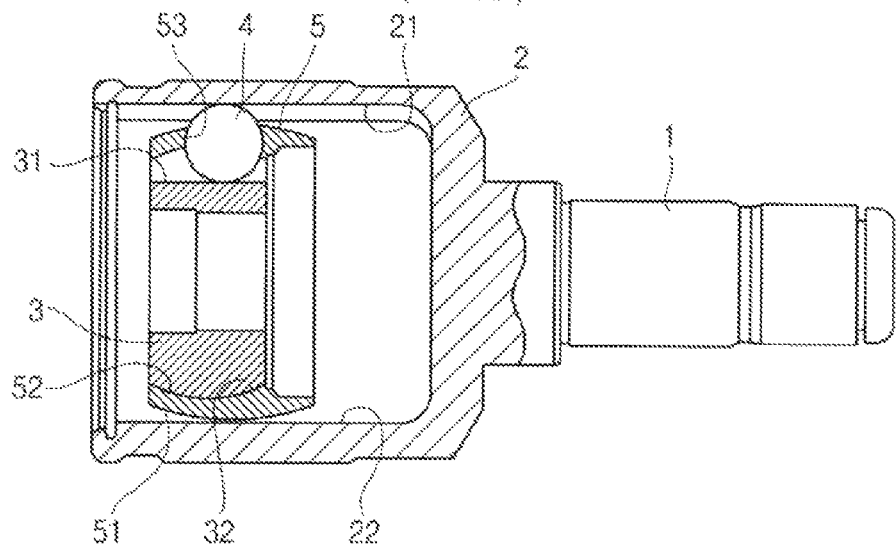
FIG. 1 is a cross-sectional view of a conventional sliding ball type constant velocity joint for a vehicle.
Figure 2:
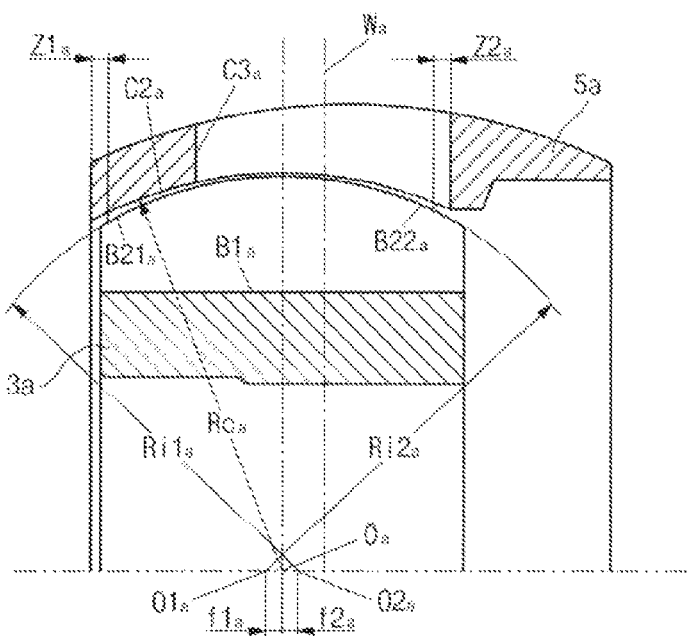
FIG. 2 is a cross-sectional view illustrating essential components of a sliding ball type constant velocity joint for a vehicle according to a first embodiment of the present invention.
Figure 3:
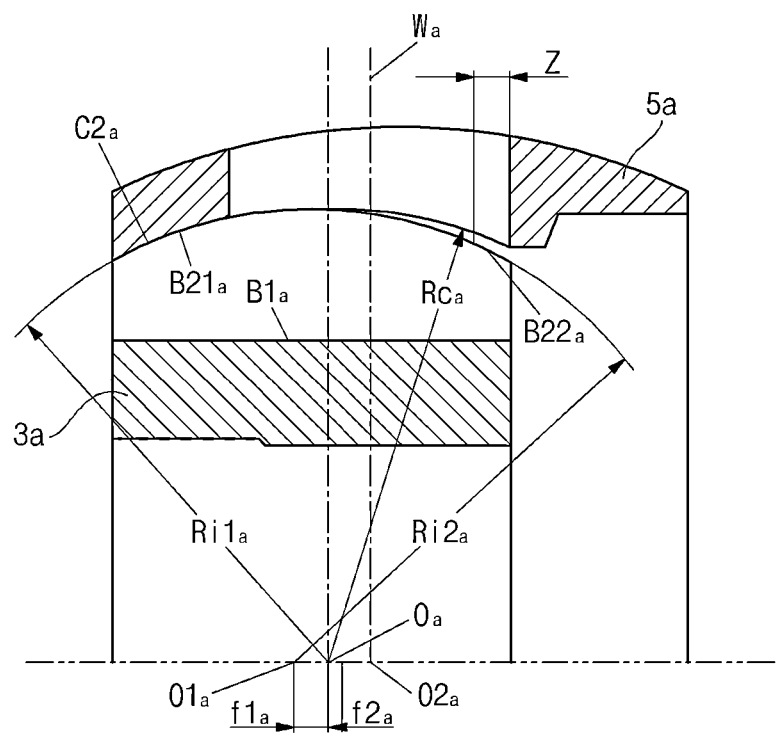
FIG. 3 is a cross-sectional view illustrating essential components of a sliding ball type constant velocity joint shown for a vehicle according to the first embodiment of the present invention during axial movement.
Figure 4:
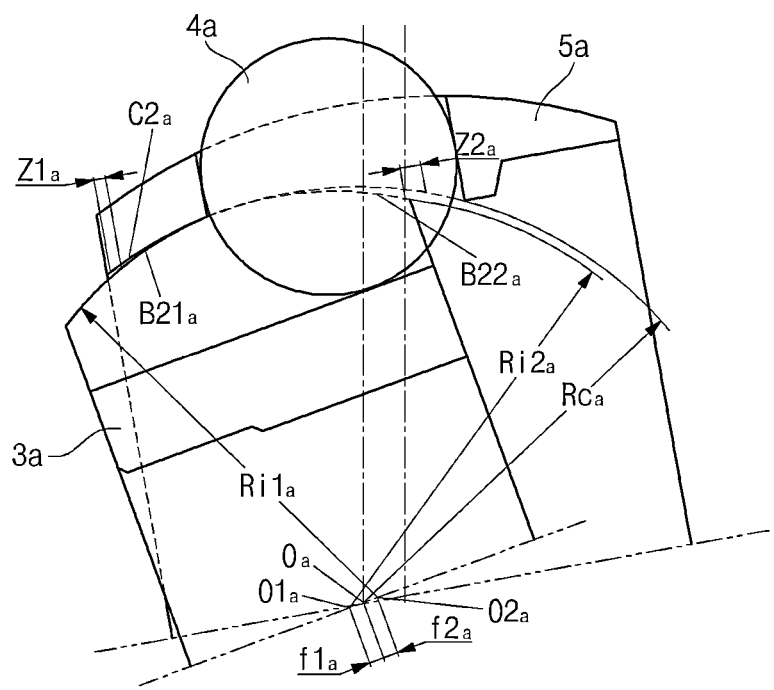
FIG. 4 is a cross-sectional view illustrating essential components of a sliding ball type constant velocity joint for a vehicle according to the first embodiment of the present invention when the joint is articulated.

FIG. 2 is a cross-sectional view illustrating essential components of a sliding ball type constant velocity joint for a vehicle according to a first embodiment of the present invention, FIG. 3 is a cross-sectional view illustrating essential components of a sliding ball type constant velocity joint shown for a vehicle according to the first embodiment of the present invention during axial movement, and FIG. 4 is a cross-sectional view illustrating essential components of a sliding ball type constant velocity joint for a vehicle according to the first embodiment of the present invention when the joint is articulated.

As shown in FIGS. 2 to 4, the sliding ball type constant velocity joint for a vehicle according to a first embodiment of the present invention includes a shaft (not shown) which receives rotational power from an engine and rotates, an outer race (not shown) which is installed at an end of the shaft and having grooves formed therein, an inner race $3a$ installed in the outer race, a plurality of balls $4a$ for transmitting the rotational power of the outer race to the inner race $3a$, and a cage $5a$ for supporting the balls $4a$. Here, an outer spherical surface of the inner race $3a$ are divided into two sections $B21_a$ and $B22_a$ having radii $Ri1_a$ and $Ri2_a$, respectively, and centers $O2_a$ and $O1_a$ of the radii $Ri2_2$ and $Ri2_a$ of the two sections $B21_a$ and $B22_a$ are axially spaced distances $f2_a$ and $f1_a$ apart from a center $O_a$ of a radius $Rc_a$ of an inner spherical surface $C2_a$ of the cage $5a$.

The radii $Rc_a$, $Ri1_a$ and $Ri2_a$ are substantially equal to each other.

The center $O_a$ of the radius $Rc_a$ of the inner spherical surface $C2_a$ of the cage $5a$ is spaced a predetermined offset distance apart from a reference line Wa.

Axial clearances $Z1_a$ and $Z2_a$ are created between the inner spherical surface $C2_a$ of the cage $5a$ and the outer spherical surfaces $B21_a$ and $B22_a$ of the inner race $3a$.

The ball $4a$ is positioned on the reference line $W_a$ to be restrained by a grinding surface $C3_a$ of the cage $5a$.

Figure 5:
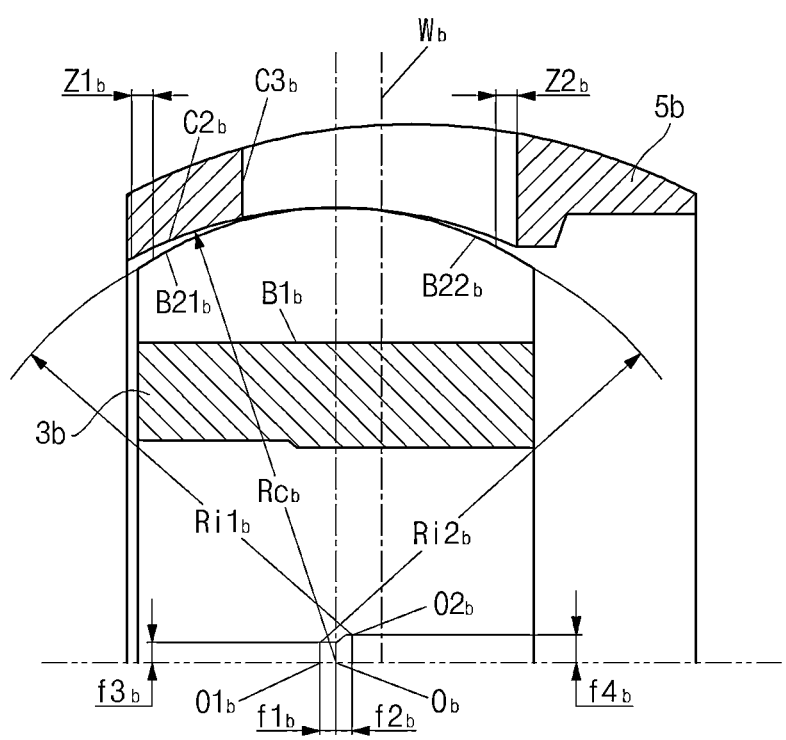
FIG. 5 is a cross-sectional view illustrating essential components of a sliding ball type constant velocity joint for a vehicle according to a second embodiment of the present invention.

FIG. 5 is a cross-sectional view illustrating essential components of a sliding ball type constant velocity joint for a vehicle according to a second embodiment of the present invention.

As shown in FIG. 5, the sliding ball type constant velocity joint for a vehicle according to a second embodiment of the present invention includes a shaft (not shown) which receives rotational power from an engine and rotates, an outer race (not shown) which is installed at an end of the shaft and having grooves formed therein, an inner race $3b$ installed in the outer race, a plurality of balls (not shown) for transmitting the rotational power of the outer race to the inner race $3b$, and a cage $5b$ for supporting the balls. Here, an outer spherical surface of the inner race $3b$ have two sections $B21_b$ and $B22_b$ having radii $Ri1_b$ and $Ri2_b$, respectively, and centers $O2_b$ and $O1_b$ of the radii $Ri1_b$ and $Ri2_b$ are axially spaced distances $f2_b$ and $f1_b$ apart from a center Ob of a radius $Rc_b$ of an inner spherical surface $C2_b$ of the cage $5b$ and are radially spaced distances $f4_b$ and $f3_b$ apart from the center $O_b$ of the radius $Rc_b$ of the inner spherical surface $C2_b$ of the cage $5b$.

The radii $Ri1_b$ and $Ri2_b$ are smaller than the radius $Rc_b$ of the inner spherical surface $C2_b$ of the cage $5b$.

The center Ob of the radius $Rc_b$ of the inner spherical surface $C2_b$ of the cage $5b$ is spaced a predetermined offset distance apart from a reference line $W_b$.

Axial clearances $Z1_b$ and $Z2_b$ are created between the inner spherical surface $C2_b$ of the cage $5b$ and outer spherical surfaces $B21_b$ and $B22_b$ of the inner race $3b$.

The ball is positioned on the reference line $W_b$ and is then restrained by a grinding surface $C3_b$ of the cage $5b$.

Figure 6:
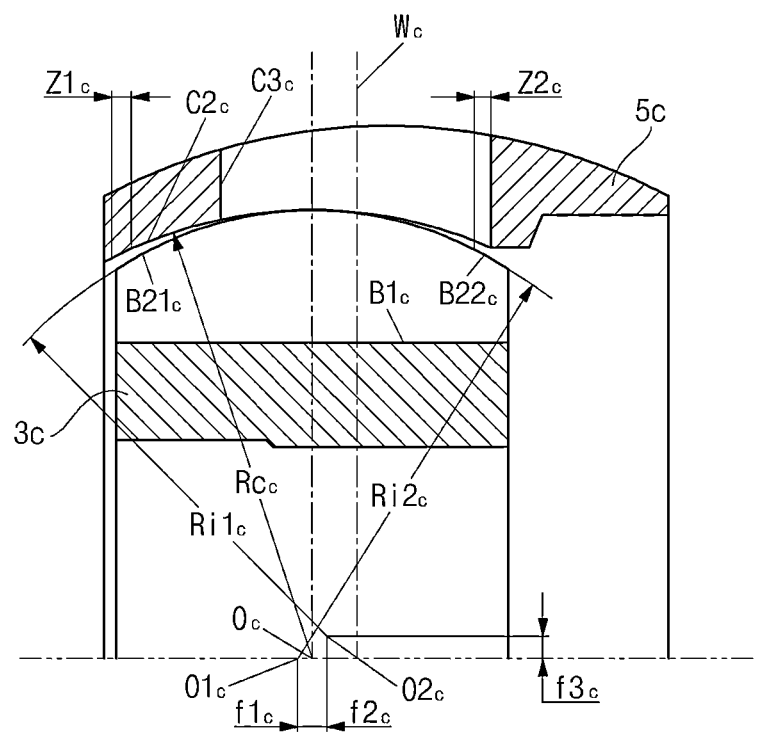
FIG. 6 is a cross-sectional view illustrating essential components of a sliding ball type constant velocity joint for a vehicle according to a third embodiment of the present invention.

FIG. 6 is a cross-sectional view illustrating essential components of a sliding ball type constant velocity joint for a vehicle according to a third embodiment of the present invention.

As shown in FIG. 6, the sliding ball type constant velocity joint for a vehicle according to a third embodiment of the present invention includes a shaft (not shown) which receives rotational power from an engine and rotates, an outer race (not shown) which is installed at an end of the shaft and having grooves formed therein, an inner race $3c$ installed in the outer race, a plurality of balls (not shown) for transmitting the rotational power of the outer race to the inner race $3c$, and a cage $5c$ for supporting the balls. Here, an outer spherical surface of the inner race $3c$ have two sections $B21_c$ and $B22_c$ of the inner race $3c$ have radii $Ri1_c$ and $Ri2_c$, respectively, and centers $O2_c$ and $O1_c$ of the radii $Ri1_c$ and $Ri2_c$ are axially spaced distances $f2_c$ an $f1_c$ apart from a center $O2_c$ of a radius $Rc_c$ of an inner spherical surface $C2_c$ of the cage $5c$, and the center $O2_c$ is radially spaced a distance $f3_c$ apart from the center $O_c$ of the radius $Rc_c$ of the inner spherical surface $C2_c$ of the cage $5c$.

The radius $Ri1_c$ is smaller than the radius $Rc_c$ of the inner spherical surface $C2_c$ of the cage $5c$, and the radius $Ri2_c$ and the radius $Rc_c$ are substantially equal to each other.

The center $O_c$ of the radius $Rc_c$ of the inner spherical surface $C2_c$ of the cage $5c$ is spaced a predetermined offset distance apart from a reference line $W_c$.

Axial clearances $Z1_c$ and $Z2_c$ are created between the inner spherical surface $C2_c$ of the cage $5c$ and outer spherical surfaces $B21_c$ and $B22_c$ of the inner race $3c$.

The ball is positioned on the reference line $W_c$ and is then restrained by a grinding surface $C3_c$ of the cage $5c$.

Figure 7:
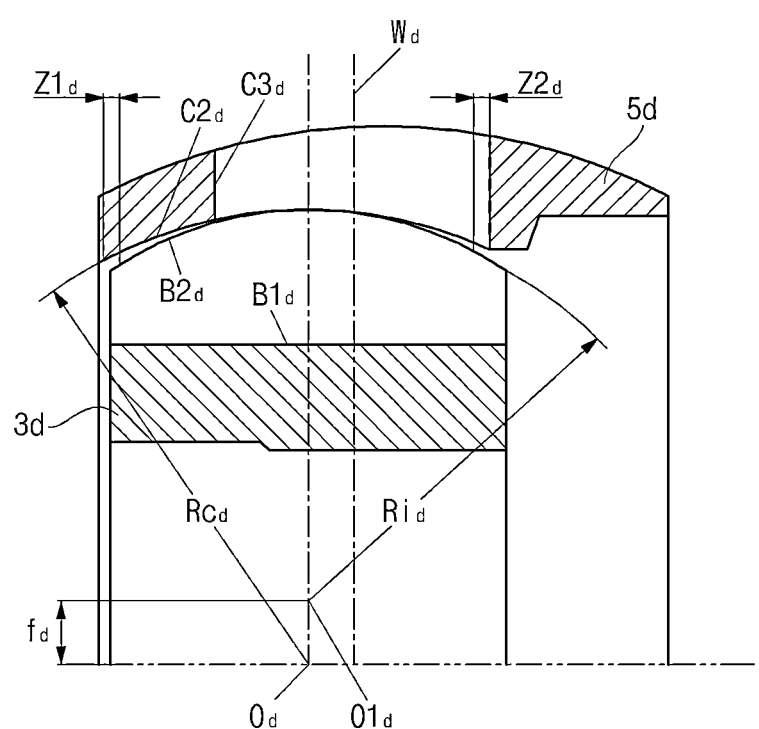
FIG. 7 is a cross-sectional view illustrating essential components of a sliding ball type constant velocity joint for a vehicle according to a fourth embodiment of the present invention.

FIG. 7 is a cross-sectional view illustrating essential components of a sliding ball type constant velocity joint for a vehicle according to a fourth embodiment of the present invention.

As shown in FIG. 7, the sliding ball type constant velocity joint for a vehicle according to a fourth embodiment of the present invention includes a shaft (not shown) which receives rotational power from an engine and rotates, an outer race (not shown) which is installed at an end of the shaft and having grooves formed therein, an inner race $3d$ installed in the outer race, a plurality of balls (not shown) for transmitting the rotational power of the outer race to the inner race $3d$, and a cage $5d$ for supporting the balls. Here, an outer spherical surface $B2_d$ of the inner race $3d$ has a radius $Ri_d$, and a center $O1_d$ of the radius $Ri_d$ is radially spaced a distance $f_d$ apart from a center $O_d$ of a radius $Rc_d$ of an inner spherical surface $C2_d$ of the cage $5d$.

The radius $Ri_d$ is smaller than the radius $Rc_d$ of the inner spherical surface $C2_d$ of the cage $5d$.

The center $O_d$ of the radius $Rc_d$ of the inner spherical surface $C2_d$ of the cage $5d$ is spaced a predetermined offset distance apart from a reference line $W_d$.

Axial clearances $Z1_d$ and $Z2_d$ are created between the inner spherical surface $C2_d$ of the cage $5d$ and the outer spherical surface $B2_d$ of the inner race $3d$.

The ball is positioned on the reference line Wd and is then restrained by a grinding surface $C3_d$ of the cage $5d$.

Figure 8:
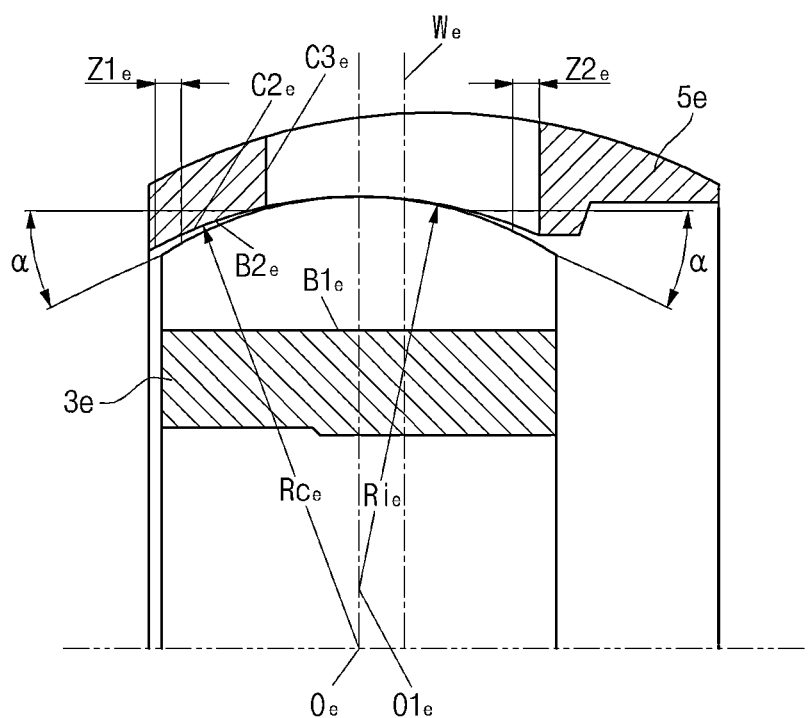
FIG. 8 is a cross-sectional view illustrating essential components of a sliding ball type constant velocity joint for a vehicle according to a fifth embodiment of the present invention.

FIG. 8 is a cross-sectional view illustrating essential components of a sliding ball type constant velocity joint for a vehicle according to a fifth embodiment of the present invention.

As shown in FIG. 8, the sliding ball type constant velocity joint for a vehicle according to a fifth embodiment of the present invention includes a shaft (not shown) which receives rotational power from an engine and rotates, an outer race (not shown) which is installed at an end of the shaft and having grooves formed therein, an inner race $3e$ installed in the outer race, a plurality of balls (not shown) for transmitting the rotational power of the outer race to the inner race $3e$, and a cage $5e$ for supporting the balls. Here, an outer spherical surface $B2_e$ of the inner race $3e$ has a radius $Ri_e$, taper angles ($\alpha$) are formed at opposite ends of the outer spherical surface $B2_e$ of the inner race $3e$, and a center $O1_e$ of the radius $Ri_e$ is radially spaced a distance $f_e$ apart from a center $O_e$ of a radius $Rc_e$ of an inner spherical surface $C2_e$ of the cage $5e$.

The radius $Ri_e$ is smaller than the radius $Rc_e$ of the inner spherical surface $C2_e$ of the cage $5e$.

The center $O_e$ of the radius $Rc_e$ of the inner spherical surface $C2_e$ of the cage $5e$ is spaced a predetermined offset distance apart from a reference line $W_e$.

Axial clearances $Z1_e$ and $Z2_e$ are created between the inner spherical surface $C2_e$ of the cage $5e$ and the outer spherical surface $B2_e$ of the inner race $3e$.

The ball is positioned on the reference line $W_e$ and is then restrained by a grinding surface $C3_e$ of the cage $5e$.

The aforementioned sliding ball type constant velocity joint according to the fifth embodiment of the present invention operates as follows.

As the rotational power outputted from an engine (not shown) is transmitted to the shaft through a transmission (not shown) and then transmitted to the inner races $3a$, $3b$, $3c$, $3d$ or $3e$ through the outer race and the ball, so that then a wheel (not shown) is rotated.

The ball is restrained by the grinding surface $C3_a$, $C3_b$, $C3_c$, $C3_d$, $C3_e$ of the cage $5a$, $5b$, $5c$, $5d$, $5e$ and is also restrained between the track groove of the outer race and a track groove $B1_a$, $B1_b$, $B2_c$, $B1_d$ or $B1_e$ of the inner race $3a$, $3b$, $3c$, $3d$, $3e$ to transmit rotational torque. In this case, the inner spherical surface $C2_a$, $C2_b$, $C2_c$, $C2_d$, $C2_e$ of the cage $5a$, $5b$, $5c$, $5d$, $5e$ restrains the outer spherical surfaces $B21_a$, $B22_a$, $B21_b$, $B22_b$, $B21_c$, $B22_c$, $B21_d$, $B22_d$, $B21_e$, $B22_e$ of the inner race 3*a*, 3*b*, 3*c*, 3*d*, 3*e*, and the grinding surface C3*ₐ*, C3*ᵦ*, C3*ᵧ*, C3*ᵨ*, C3*ₑ* of the cage 5*a*, 5*b*, 5*c*, 5*d*, 5*e* restrains the balls, thereby enabling axial sliding and articulated joint movement. When the joint is articulated, the cage 5*a*, 5*b*, 5*c*, 5*d*, 5*e* and the balls are positioned on a bisecting line of an operating angle, thereby enabling constant velocity movement.

Therefore, as the ball slidably moves in the track groove of the outer race, the joint is articulated to follow the displacement of the vehicle.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A sliding ball type constant velocity joint for a vehicle, comprising:
    an outer race having grooves formed therein;
    an inner race installed in the outer race;
    a plurality of balls for transmitting the rotational power of the outer race to the inner race; and
    a cage for supporting the balls, the cage being disposed about a central axis and having an inner arcuate surface, the cage including at least one opening extending into the cage from the inner arcuate surface for receiving at least one of the balls, the inner arcuate surface defining a continuously arcuate segment along the entire opening in a cross sectional plane extending along the central axis;
    wherein a center of a radius of an outer arcuate surface of the inner race is formed at a different location from a center of a radius of the inner arcuate surface of the cage, the outer arcuate surface of the inner race is divided into two sections having different radii, one of the radii of the two sections of the outer arcuate surface of the inner race is smaller than the radius of the inner arcuate surface of the cage, and the other of the radii of the two sections of the outer arcuate surface of the inner race is equal to the radius of the inner arcuate surface of the cage.

2. A sliding ball type constant velocity joint for a vehicle, comprising:
    an outer race having grooves formed therein;
    an inner race installed in the outer race;
    a plurality of balls for transmitting the rotational power of the outer race to the inner race; and
    a cage for supporting the balls, the cage being disposed about a central axis and having an inner arcuate surface interfacing the inner race, the cage including at least one opening extending into the cage from the inner arcuate surface for receiving at least one of the balls, the inner arcuate surface defining a continuously arcuate segment along the entire opening in a cross sectional plane extending along the central axis;
    wherein a center of a radius of an outer arcuate surface of the inner race is formed at a different location from a center of a radius of the inner arcuate surface of the cage, the outer arcuate surface of the inner race is divided into two sections having different radii, the centers of the radii of the two sections of the outer arcuate surface of the inner race are formed at locations axially moved from the center of the radius of the inner arcuate surface of the cage, and one of the centers of the radii of the two sections of the outer arcuate surface of the inner race is formed at a location radially moved from the center of the radius of the inner arcuate surface of the cage.

* * * * *